(12) United States Patent
Qiu

(10) Patent No.: US 9,560,833 B2
(45) Date of Patent: Feb. 7, 2017

(54) COLLAPSIBLE PET FOOD AND WATER DISPENSER

(71) Applicant: Bin Qiu, Jiangsu (CN)

(72) Inventor: Bin Qiu, Jiangsu (CN)

(73) Assignee: Jiangsu Zhongheng Pet Supplies Co., Ltd., Jiangsu (CN)

( * ) Notice: Subject to any disclaimer, the term of this patent is extended or adjusted under 35 U.S.C. 154(b) by 210 days.

(21) Appl. No.: 13/676,639

(22) Filed: Nov. 14, 2012

(65) Prior Publication Data

US 2013/0269620 A1    Oct. 17, 2013

(51) Int. Cl.
*A01K 5/01* (2006.01)
*A01K 7/00* (2006.01)

(52) U.S. Cl.
CPC ........... *A01K 5/0135* (2013.01); *A01K 5/0114* (2013.01); *A01K 7/00* (2013.01)

(58) Field of Classification Search
CPC .. A01K 39/012; A01K 5/0225; A01K 5/0114; A01K 39/00; A01K 39/01; A01K 39/0125; A01K 39/014; A01K 39/02; A01K 39/026; A01K 5/00; A01K 5/02; A01K 7/02; A01K 5/0135; A01K 7/00
USPC ............................. 119/52.1, 56.1, 61.56, 61.5
IPC ........................................................ A01K 5/01
See application file for complete search history.

(56) References Cited

U.S. PATENT DOCUMENTS

| | | | | |
|---|---|---|---|---|
| 3,085,718 A | * | 4/1963 | Nelson ....................... | A47F 1/08 222/168 |
| 3,810,446 A | * | 5/1974 | Kightlinger .......... | A01K 5/0135 119/61.55 |
| RE32,379 E | * | 3/1987 | Touzani ........................ | 215/372 |
| D296,371 S | * | 6/1988 | Lorenzana .................. | D30/122 |
| 4,840,143 A | * | 6/1989 | Simon .......................... | 119/52.1 |
| 5,207,182 A | * | 5/1993 | Lorenzana ..................... | 119/77 |
| D351,689 S | * | 10/1994 | VanSkiver .................. | D30/121 |
| 5,488,927 A | * | 2/1996 | Lorenzana et al. .......... | 119/51.5 |
| D374,109 S | * | 9/1996 | Lillelund .................... | D30/121 |
| D374,516 S | * | 10/1996 | Lillelund .................... | D30/121 |
| 5,738,038 A | * | 4/1998 | Barton .................... | A01K 7/02 119/73 |
| 5,758,599 A | * | 6/1998 | Glanville ........................ | 119/77 |
| 6,055,932 A | * | 5/2000 | Weber .......................... | 119/52.1 |
| 6,119,628 A | * | 9/2000 | Lorenzana et al. ............. | 119/77 |
| 6,142,099 A | * | 11/2000 | Lange, Jr. .................... | 119/51.5 |
| 6,477,981 B1 | * | 11/2002 | Harper ........................ | 119/52.4 |
| 6,739,284 B1 | * | 5/2004 | Olive .............................. | 119/74 |
| 6,866,004 B1 | * | 3/2005 | Lush ................... | A01K 39/012 119/52.1 |
| 7,028,635 B1 | * | 4/2006 | Eastman, II ................ | 119/51.11 |
| 7,032,538 B1 | * | 4/2006 | Lush ........................... | 119/52.1 |
| 7,040,249 B1 | * | 5/2006 | Mushen ................ | A01K 7/005 119/51.5 |
| 7,146,930 B1 | * | 12/2006 | Ness .............................. | 119/77 |
| D563,605 S | * | 3/2008 | Morris ........................ | D30/121 |
| 7,426,901 B2 | * | 9/2008 | Turner et al. .............. | 119/51.02 |

(Continued)

*Primary Examiner* — Kathleen Alker

(74) *Attorney, Agent, or Firm* — Hauptman Ham, LLP

(57) ABSTRACT

A collapsible feeder, relating to a pet feeder, includes a top cover, a collapsible barrel body, a discharge port, a base and a food basin. The food basin is disposed at one end of the base, and the collapsible barrel body is disposed at the other end of the base. The top cover is disposed at the top of the collapsible barrel body. A bottom of the collapsible barrel body is higher than a rim of the food basin, and the discharge port forms an angle of 30 degrees with respect to a horizontal line of a bottom of the food basin.

6 Claims, 1 Drawing Sheet

(56) References Cited

U.S. PATENT DOCUMENTS

| | | | |
|---|---|---|---|
| 7,484,475 B2* | 2/2009 | Milliner | 119/52.1 |
| 8,336,493 B1* | 12/2012 | Weber | 119/52.1 |
| D703,392 S * | 4/2014 | Desberg | D30/121 |
| 2007/0089678 A1* | 4/2007 | Greenwood | 119/61.5 |
| 2007/0193524 A1* | 8/2007 | Turner | A01K 5/0114 119/51.02 |
| 2009/0283047 A1* | 11/2009 | Swenson | A01K 5/0114 119/61.55 |
| 2011/0107973 A1* | 5/2011 | Jenkins | 119/52.1 |
| 2012/0017837 A1* | 1/2012 | Crawford | A01K 5/01 119/61.1 |
| 2012/0125263 A1* | 5/2012 | Northrop et al. | 119/52.1 |

* cited by examiner

COLLAPSIBLE PET FOOD AND WATER DISPENSER

CROSS REFERENCE TO RELATED APPLICATION

The present application is based on, and claims priority from, Chinese Application Number 201220181422.X, filed Apr. 16, 2012, the disclosure of which is incorporated herein in its entirety.

TECHNICAL FIELD

The present disclosure relates to a pet feeder, and in particular is a collapsible feeder.

BACKGROUND ART

Since the reform and opening of China, the national economy has grown rapidly; "innovation in science and technology, autonomous innovation" has now become the mainstream in industrial development within China, and Chinese industry is gradually developing in the direction of intensive industry, energy conservation, emissions reduction, and low carbon. As society develops, people enjoy material living but at the same time are in eternal pursuit of a spiritual life, and an ever greater number of people enjoy keeping pets of all types. Pets must eat and drink fixed amounts at the right times; this helps to train a pet so that it develops good eating and drinking habits, while also playing a definite role in the cleanliness and sanitation of the owner's indoor environment. However, if the owner goes away on a business trip or is not at home for a few days, there will be nobody to feed the pet on time, causing the owner who feeds the pet a certain amount of worry. There is currently a huge variety of feeders for pets on the market, the majority being automatic feeders, which have a relatively large volume, take up space, are inconvenient to store, carry and transport, and have a relatively high price; people wish there could be a feeder product of simple design and high quality at a reasonable price. In order to solve this problem, scientific and technological personnel in scientific research organizations and enterprises have been engaged in continuous research and exploration, making use of modern science and technology, and although some progress has been made in terms of technology, practical application still presents a technical stumbling block which is yet to be overcome.

SUMMARY

One or more objects of one or more embodiments of the present disclosure is to overcome the above inadequacies by providing a collapsible feeder, which has a collapsible barrel body, a large food storage capacity and a simple structure, and can be transported conveniently and at a reduced cost.

The technical solution employed by the present disclosure to solve the technical problem thereof is as follows: comprising a top cover, a collapsible barrel body, a discharge port, a base and a food basin; the food basin is disposed at one end of the base, the collapsible barrel body being disposed at the other end of the base, the collapsible barrel body is shaped like a spring, the top cover is disposed at the top of the collapsible barrel body, the discharge port is disposed between the bottom of the collapsible barrel body and the food basin, the bottom of the collapsible barrel body being higher than a rim of the food basin, and the discharge port forms an angle of 30 degrees with respect to the horizontal line of the bottom of the food basin, so as to form a collapsible feeder.

The technical principles employed by the present disclosure are as follows: It is designed to make use of the principle of gravity. Being made from blow-molded material, the collapsible barrel body is sturdy and durable, and easy to clean; since the collapsible barrel body is shaped like a spring, the height thereof can be freely adjusted according to the amount of pet food stored therein by the owner. The fact that the bottom of the collapsible barrel body is higher than the rim of the food basin, and the discharge port forms an angle of 30 degrees with respect to the horizontal line of the bottom of the food basin, ensures that pet food stored in the collapsible barrel body can slide down freely under its own weight to the food basin in the base. When the height of pet food in the food basin is level with the discharge port, the discharge port is blocked and the pet food stored in the collapsible barrel body no longer slides down freely. When a pet comes to the feeder to eat, the amount of pet food in the food basin will gradually decrease, and pet food stored in the collapsible barrel body will slide down freely from the discharge port until the pet has eaten its fill; thus the problem of nobody feeding the pet on time when the owner is away on a business trip or not at home is solved, while good eating habits may also be fostered in the pet. Moreover, the barrel body of the feeder is collapsible, which is convenient for the user and for transportation of the product.

The present disclosure has the following benefits: It is designed to make use of the principle of gravity. The barrel body thereof is collapsible, it has a large food storage capacity and a simple structure, is sturdy and durable and can be transported conveniently and at a reduced cost.

BRIEF DESCRIPTION OF DRAWINGS

The present disclosure is described further below with reference to accompanying drawings and an embodiment.

DETAILED DESCRIPTION

Figure 1:
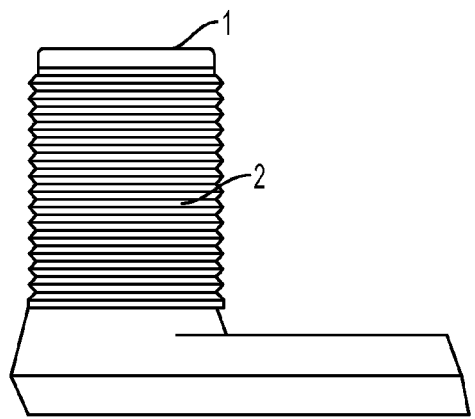
FIG. 1 is a schematic main view of the structure of the collapsible feeder according to the embodiment.
Figure 2:
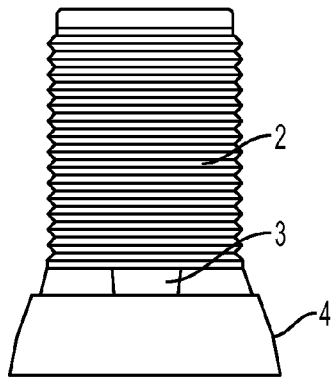
FIG. 2 is a schematic view from the right of the structure of the collapsible feeder according to the embodiment.

In FIG. 1, FIG. 2, FIG. 3 and FIG. 4: the food basin 5 is disposed at one end of the base 4, the collapsible barrel body 2 being disposed at the other end of the base, the collapsible barrel body 2 is shaped like a spring, the collapsible barrel body 2 being formed in one piece, the top cover 1 is disposed at the top of the collapsible barrel body 2, the discharge port is disposed between the bottom of the collapsible barrel body 2 and the food basin 5, the bottom of the collapsible barrel body 2 being higher than a rim of the food basin 5, and the discharge port 3 forms an angle of 30 degrees with respect to the horizontal line of the bottom of the food basin 5, so as to form a collapsible feeder.

Figure 3:
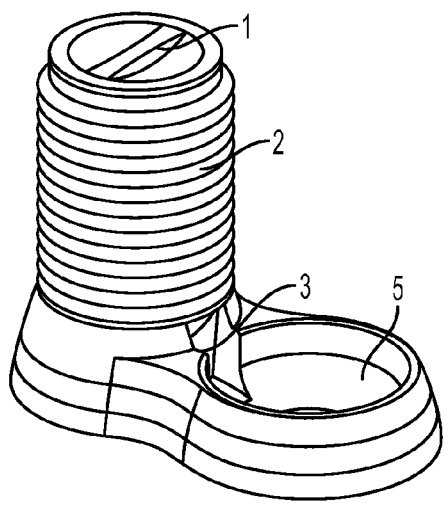
FIG. 3 is a schematic three-dimensional view of the structure of the collapsible feeder according to the embodiment.
Figure 4:
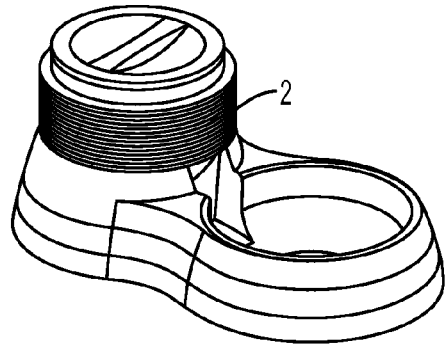
FIG. 4 is a schematic three-dimensional view of the structure of the collapsible feeder according to the embodiment after contraction of the barrel body.

As shown in FIGS. 3-4, a portion of the discharge port 3 being located above the rim of the food basin 5, a bottom edge of the collapsible barrel body 2 defines an opening of the collapsible barrel body and is higher than a rim of the food basin 5. Further, the bottom edge of the collapsible barrel body 2 is connected with the rim of the food basin 5 by the discharge port 3. The discharge port 3 has a first portion located above the rim of the food basin 5 and a second portion connecting with the first portion and located below the rim of the food basin 5. The base 4 further includes a side wall connecting the food basin 5 with the collapsible barrel body 2. The bottom edge of the collapsible barrel body 2 is directly laid over a top edge of the side wall and the discharge port 3 interrupts the rim of the food basin 5.

The collapsible feeder is designed to make use of the principle of gravity. Being made from blow-molded material, the collapsible barrel body 2 is sturdy and durable, and easy to clean; since the collapsible barrel body 2 is shaped like a spring, the height thereof can be freely adjusted according to the amount of pet food stored therein by the owner. The fact that the bottom of the collapsible barrel body 2 is higher than the rim of the food basin 5, and the discharge port 3 forms an angle of 30 degrees with respect to the horizontal line of the bottom of the food basin 5, ensures that pet food stored in the collapsible barrel body 2 can slide down freely under its own weight to the food basin 5 in the base 4. When the height of pet food in the food basin 5 is level with the discharge port 3, the discharge port 3 is blocked and the pet food stored in the collapsible barrel body 2 no longer slides down freely. When a pet comes to the feeder to eat, the amount of pet food in the food basin 5 will gradually decrease, and pet food stored in the collapsible barrel body 2 will slide down freely from the discharge port 3 until the pet has eaten its fill; thus the problem of nobody feeding the pet on time when the owner is away on a business trip or not at home is solved, while good eating habits may also be fostered in the pet. Moreover, the barrel body of the feeder is collapsible, which is convenient for the user and for transportation of the product.

The invention claimed is:

1. A collapsible feeder, comprising:
 a top cover having a handle, a collapsible barrel body, a discharge port, a base and a food basin,
wherein
 an upper surface of the top cover has a recessed surface to which the handle is mounted,
 a highest point of the handle is flush with a highest point of the upper surface of the top cover,
 the food basin is disposed at one end of the base,
 the collapsible barrel body is disposed at the other end of the base,
 the collapsible barrel body is in a spring shape,
 the top cover is disposed at a top of the collapsible barrel body,
 the discharge port is disposed between a bottom of the collapsible barrel body and the food basin, the bottom of the collapsible barrel body being higher than a rim of the food basin and a portion of the discharge port being located above the rim of the food basin,
 the discharge port forms an angle of 30 degrees with respect to a horizontal line of a bottom of the food basin,
 the discharge port is located between the collapsible barrel body and the food basin,
 the food basin has a side wall and a bottom connected with the side wall,
 the discharge port has one end joined to the food basin, and said one end of the discharge port is located at a connection between the side wall and the bottom of the food basin and adjacent to the collapsible barrel body, and
 the side wall defines a curved surface extending downward from a top edge of the side wall to the bottom of the food basin to form a substantially hemispherical-shaped internal cavity of the food basin.

2. The collapsible feeder according to claim 1, wherein the discharge port has a remainder portion connecting with said portion of the discharge portion being located above the rim of the food basin, and
the remainder portion is located below the rim of the food basin.

3. The collapsible feeder according to claim 1, wherein the base further includes a side wall connecting the food basin with the collapsible barrel body, and
the bottom of the collapsible barrel body is directly laid over a top edge of the side wall.

4. The collapsible feeder according to claim 1, wherein the discharge port interrupts the rim of the food basin.

5. The collapsible feeder according to claim 1, wherein the discharge port interrupts the curved surface of the side wall of the food basin.

6. The collapsible feeder according to claim 5, wherein the curved surface of the side wall of the food basin defines the angle of the discharge port.

\* \* \* \* \*